United States Patent
Fu et al.

(10) Patent No.: US 12,188,903 B2
(45) Date of Patent: Jan. 7, 2025

(54) BOOM MONITORING METHOD AND SYSTEM, AND ENGINEERING MACHINERY, AND MACHINE-READABLE STORAGE MEDIUM

(71) Applicant: ZOOMLION HEAVY INDUSTRY SCIENCE AND TECHNOLOGY CO., LTD., Changsha (CN)

(72) Inventors: Ling Fu, Changsha (CN); Lingjuan She, Changsha (CN); Yanbin Liu, Changsha (CN); Li Yin, Changsha (CN)

(73) Assignee: ZOOMLION HEAVY INDUSTRY SCIENCE AND TECHNOLOGY CO., LTD., Changsha (CN)

( * ) Notice: Subject to any disclaimer, the term of this patent is extended or adjusted under 35 U.S.C. 154(b) by 296 days.

(21) Appl. No.: 17/911,379

(22) PCT Filed: Jul. 8, 2020

(86) PCT No.: PCT/CN2020/100875
§ 371 (c)(1),
(2) Date: Sep. 13, 2022

(87) PCT Pub. No.: WO2021/232555
PCT Pub. Date: Nov. 25, 2021

(65) Prior Publication Data
US 2023/0096788 A1    Mar. 30, 2023

(30) Foreign Application Priority Data
May 22, 2020   (CN) .......................... 202010438466.5

(51) Int. Cl.
*G01N 29/04*   (2006.01)
*G01N 21/95*   (2006.01)

(52) U.S. Cl.
CPC ....... *G01N 29/043* (2013.01); *G01N 21/9515* (2013.01); *G01N 2291/0234* (2013.01); *G01N 2291/0289* (2013.01)

(58) Field of Classification Search
CPC ............. G01N 29/043; G01N 21/9515; G01N 2291/0234; G01N 2291/0289;
(Continued)

(56) References Cited

U.S. PATENT DOCUMENTS

| 5,814,729 A | 9/1998 | Wu et al. |
| 7,117,742 B2 | 10/2006 | Kim |

(Continued)

FOREIGN PATENT DOCUMENTS

| CN | 104181000 A | 12/2014 |
| CN | 105241957 A | 1/2016 |

(Continued)

OTHER PUBLICATIONS

Extended European Search Report issued on Jul. 27, 2023 for European Patent Application No. 20937156.6.
(Continued)

*Primary Examiner* — Francis C Gray
(74) *Attorney, Agent, or Firm* — Volpe Koenig

(57) ABSTRACT

The present invention discloses a boom monitoring method and engineering machinery comprising a boom monitoring system. The method comprises obtaining a boom damage signal monitored in boom operation by a piezoelectric sensing network formed by a plurality of piezoelectric sensors arranged at different points on a boom, and determining a damage position of the boom and a corresponding first boom damage value such that when the first boom damage value reaches a preset starting value of an optical fiber sensing network formed by a plurality of optical fiber sensors arranged at the different monitoring points on the
(Continued)

| Piezoelectric sensing network 100 | — | Monitoring mechanism 200 | boom, optical wave values of the corresponding monitoring points are obtained and a boom crack signal is determined. A second boom damage value is calculated according to the boom crack signal, which comprises a crack change factor and a crack length. According to the present invention, the boom is monitored with improved efficiency.

19 Claims, 6 Drawing Sheets

(58) Field of Classification Search
CPC .. G01N 29/11; G01N 29/46; G01N 2291/106; G01N 29/2437; G01N 29/2475; G01N 29/04; G01M 5/0025; G01M 5/0033; G01M 5/0066
See application file for complete search history.

(56) References Cited

U.S. PATENT DOCUMENTS

| | | | |
|---|---|---|---|
| 2005/0061076 | A1 | 3/2005 | Kim |
| 2006/0179949 | A1* | 8/2006 | Kim .................. G01N 29/4463 73/618 |
| 2011/0241704 | A1* | 10/2011 | Laflamme ............... G01B 7/22 324/663 |
| 2016/0320219 | A1* | 11/2016 | Hellevang ............... G01N 29/22 |

FOREIGN PATENT DOCUMENTS

| | | | |
|---|---|---|---|
| CN | 107590975 | A | 1/2018 |
| CN | 108508097 | A | 9/2018 |
| CN | 108645727 | A * | 10/2018 |
| CN | 109959724 | A | 7/2019 |
| CN | 111337514 | A | 6/2020 |
| CN | 111693603 | A | 9/2020 |
| CN | 111693604 | A | 9/2020 |
| DE | 102020100269 | A1 * | 7/2021 |
| KR | 20130027729 | A | 3/2013 |
| WO | 2018/205194 | A1 | 11/2018 |

OTHER PUBLICATIONS

Qing, X. "A Hybrid Piezoelectric/Fiber Optic Diagnostic System for Structural Health Monitoring," Paper, Smart Materials and Structures, (2005).

Yuan, Shenfang et al. "Application Research of a Hybrid Piezoelectric Optic Fiber Integrated Structural Health Monitoring System", vol. 30, No. 02, Feb. 28, 2009 (Feb. 28, 2009), ISSN: 1000-6893, pp. 348-356.

Muneesh Maheshwari, Venu G. M. Annamdas, John H. L. Pang, Anand Asundi & Swee C. Tjin (2017) Crack monitoring using multiple smart materials; fiber-optic sensors & piezo sensors, International Journal of Smart and Nano Materials, 8:1, 41-55, DOI:10.1080/19475411.2017.1298220.

Research on composite detection method of mechanical plate structural damage based on multi-source excitation and fiber Bragg grating sensing ISSN 1674-022X; CN 11-9133/G; May 15, 2019.

* cited by examiner

BOOM MONITORING METHOD AND SYSTEM, AND ENGINEERING MACHINERY, AND MACHINE-READABLE STORAGE MEDIUM

CROSS REFERENCE TO RELATED APPLICATIONS

This application is a 35 USC § 371 National Stage application of International Patent Application No. PCT/CN2020/100875, which was filed Jul. 8, 2020, entitled "BOOM MONITORING METHOD AND SYSTEM, AND ENGINEERING MACHINERY, AND MACHINE-READABLE STORAGE MEDIUM" and claims priority to Chinese Patent Application No. 202010438466.5, filed May 22, 2020 which is incorporated herein by reference as if fully set forth.

FIELD OF THE INVENTION

The present invention relates to the field of engineering machinery, in particular to a boom monitoring method and system, and engineering machinery and a machine-readable storage medium.

BACKGROUND OF THE INVENTION

A boom is a key load-bearing structure of engineering machinery, and its safety and reliability is of great importance to the safe operation of large equipment. In the boom design process, the design life of a metal structure is determined according to the load spectrum factor and the operation level in the specifications, both of which should be determined by the actual load combination. However, the actual load combination is difficult to predict, and is often selected by experience during design. Because of the difference between the actual operating conditions and the expected operating conditions, the service life often deviates from the design life, resulting in a large number of safety accidents in the actual use process. In addition, the use environment of the engineering machinery and equipment is complex and harsh, so that the boom may collide with other objects during use, causing damage to the boom structure, which further aggravates the safety hazards of the engineering machinery and equipment in use. Therefore, it is particularly important to carry out real-time health monitoring of the boom, to master the damage of the structure during use, and to determine whether it is within the safety margin.

At present, there are three main health monitoring solutions that can be applied to boom structures:

1) A fiber Bragg grating sensor, an interferometric fiber optic sensor and piezoelectric ceramic are pasted or embedded into a specified structure, and respectively connected to a fiber Bragg grating interrogator, an interferometric fiber interrogator and a piezoelectric ceramic interrogator. The fiber Bragg grating interrogator, the interferometric fiber interrogator and the piezoelectric ceramic interrogator are then connected to a controller, the controller is connected to a DTU (Data Terminal Unit), and the DTU is connected to a computer. Finally, through the cooperation of the three types of sensors, the computer obtains the sensor data to judge whether the corresponding structure is damaged or not. However, in this solution, the three types of sensors monitor the structure independently, so the arrangement modes of the three types of sensors need to be designed separately. Therefore, this solution requires massive peripherals and complex process, and cannot fully exert the advantages of the various types of sensors.

2) A first subsystem having a large-area multi-damage monitoring function, a second subsystem having a microdamage monitoring function, a third subsystem having an impact monitoring function, a fourth subsystem having a strain monitoring function and a fifth subsystem having a function of predicting the residual strength and life of the structure are integrated in the specified structure. The sensor network is connected to each of the subsystems. The sensor network comprises piezoelectric sensors, optical fiber sensors, smart coatings, flexible eddy-current sensors, CVM sensors and other sensing elements. This solution has a plenty of health monitoring functions, but requires a large number of sensing elements in the actual monitoring process due to the design of its multiple subsystems. For example, hundreds of piezoelectric sensors may be required, which undoubtedly increases the cost on structure health monitoring and the difficulty in element arrangement.

3) The conventional structure health monitoring technique (for example, the solution in item 2)) and the automated nondestructive testing technique are combined to realize, based on their respective advantages, rapid quantitative testing for the damage and automated evaluation of residual strength/life of the structure. However, this solution not only has the defect of the solution in item 2), but also introduces more elements due to the application of the automated nondestructive testing technique, which further increases the cost on structure health monitoring and the difficulty in element arrangement.

In addition, the above three structure health monitoring solutions can only locate and evaluate the damage based on the damage monitoring function of the optical fiber sensors, piezoelectric sensors or other sensing elements, and there is a lack of a comprehensive monitoring signal processing algorithm. As a result, the above three solutions can only roughly determine the position and degree of the damage, and cannot accurately reflect the exact situation of the damage.

Therefore, the existing health monitoring solutions applied to the boom structure have problems such as high cost, complex arrangement, and inaccurate location and evaluation of the damage.

SUMMARY OF THE INVENTION

An objective of the present invention is to provide a boom monitoring method to at least partially solve the above technical problems.

In order to achieve the above objective, embodiments of the present invention provide a boom monitoring method, comprising: obtaining a boom damage signal monitored during operation of the boom by a piezoelectric sensing network formed by a plurality of piezoelectric sensors arranged at different monitoring points on a boom; determining a damage position of the boom and a corresponding first boom damage value according to the boom damage signal; obtaining, when the first boom damage value reaches a preset starting value of an optical fiber sensing network formed by a plurality of optical fiber sensors arranged at the different monitoring points on the boom, optical wave values of the corresponding monitoring points monitored by the optical fibers sensors; and determining a boom crack signal according to the optical wave values, and calculating a second boom damage value according to the boom crack signal, wherein the boom crack signal comprises a crack change factor and a crack length.

Preferably, the piezoelectric sensors on each monitoring path of the piezoelectric sensing network comprise a trigger sensor for sending an excitation signal and a receiving sensor for responding to the excitation signal, the boom damage signal is a mechanical wave response signal of the receiving sensor in response to the excitation signal, and the trigger sensor and the receiving sensor are interchangeable.

Preferably, the determining a damage position of the boom and a corresponding first boom damage value according to the boom damage signal comprises: calculating a first damage change characteristic value of a current boom damage signal on each monitoring path in the piezoelectric sensing network relative to a corresponding initial damage signal, wherein the initial damage signal is a damage signal measured by the piezoelectric sensor before the boom operates; determining, in the case where the first damage change characteristic value is not zero, the damage position of the boom according to the first damage change characteristic value and corresponding monitoring path parameters; and calculating a second damage change characteristic value of the receiving sensor corresponding to the damage position relative to the trigger sensor, and taking the second damage change characteristic value as the first boom damage value.

Preferably, the determining the damage position of the boom according to the first damage change characteristic value and the corresponding monitoring path parameters comprises: calculating, for each monitoring path of each piezoelectric sensing network, a plurality of damage values of each receiving sensor relative to the determined trigger sensor according to the first damage change characteristic value; determining, in conjunction with the monitoring path parameters, the monitoring point corresponding to the maximum value among the plurality of damage values as an initial damage position; repeating the above steps using another piezoelectric sensor as the trigger sensor to obtain a plurality of initial damage positions until every piezoelectric sensor has been used as the trigger sensor; and determining the final damage position based on the plurality of initial damage positions.

Preferably, the determining a boom crack signal according to the optical wave values, and calculating a second boom damage value according to the boom crack signal comprises: determining the crack change factor according to the optical wave values, wherein there is a first functional relationship between the optical wave value corresponding to each optical fiber sensor and the crack change factor; determining the crack length according to the crack change factor, wherein there is a second functional relationship between the crack change factor and the crack length; and calculating the second boom damage value according to the crack length, wherein there is a third functional relationship between the crack length and the second boom damage value.

Preferably, the boom monitoring method further comprises: determining a residual life of the boom according to the second boom damage value, wherein there is a fourth functional relationship between the second boom damage value and the residual life of the boom.

Preferably, the boom monitoring method further comprises: determining arrangement modes of the piezoelectric sensing networks and the optical fiber sensing networks. And the determining comprising any one or more of: determining respective numbers and arrangement areas of the piezoelectric sensing networks and the optical fiber sensing networks; determining the arrangement mode of the piezoelectric sensing network, comprising enabling the piezoelectric sensing network to form a box monitoring structure for a specified structure of the boom; and determining the arrangement mode of the optical fiber sensing network, comprising enabling the plurality of optical fiber sensors of the optical fiber sensing network to be connected in series and to output the monitored optical wave values through a unified interface.

Preferably, the determining the arrangement mode of the piezoelectric sensing networks to enable the piezoelectric sensing network to form the box monitoring structure for the specified structure of the boom comprises: when the specified structure of the boom comprises an upper cover plate, a lower cover plate and two web plates formed between the upper cover plate and the lower cover plate, arranging at least two piezoelectric sensors on each of the upper cover plate and the lower cover plate, and arranging at least one piezoelectric sensor on each of the web plates; and determining one of the piezoelectric sensors on each of the upper cover plate and the lower cover plate as the trigger sensor, and determining the remaining piezoelectric sensors on the upper cover plate, the lower cover plate or the web plates as the receiving sensors.

Preferably, the determining the arrangement mode of the optical fiber sensing network to enable the plurality of optical fiber sensors of the optical fiber sensing network to be connected in series and to output the monitored optical wave values through a unified interface comprises: when the specified structure of the boom comprises an upper cover plate, a lower cover plate and two web plates formed between the upper cover plate and the lower cover plate, arranging, relative to a reference point arranged at a middle section of the boom, at least one optical fiber sensor on each web plate at a position close to the junction between the web plate and the corresponding upper cover plate or lower cover plate; and enabling the optical fiber sensors on the same web to be connected in series and to output the monitored optical wave values through the unified interface.

Embodiments of the present invention further provide a boom monitoring system, comprising: a piezoelectric sensing network, comprising a plurality of piezoelectric sensors arranged at different monitoring points on a boom, wherein each piezoelectric sensor is used for monitoring a boom damage signal of the corresponding monitoring point; an optical fiber sensing network, comprising a plurality of optical fiber sensors arranged at the different monitoring points on the boom, wherein each optical fiber sensor is used for monitoring an optical wave value of the corresponding monitoring point; and a monitoring mechanism. The monitoring mechanism is configured to: obtain a boom damage signal monitored during operation of the boom by the piezoelectric sensing network; determine a damage position of the boom and a corresponding first boom damage value according to the boom damage signal; obtain, when the first boom damage value reaches a preset starting value of the optical fiber sensing network, optical wave values of the corresponding monitoring points monitored by the optical fibers sensors; and determine a boom crack signal comprising a crack change factor and a crack length according to the optical wave values, and calculate a second boom damage value according to the boom crack signal.

Preferably, the piezoelectric sensors on each monitoring path of the piezoelectric sensing network comprise a trigger sensor for sending an excitation signal and a receiving sensor for responding to the excitation signal, the boom damage signal is a mechanical wave response signal of the receiving sensor in response to the excitation signal, and the trigger sensor and the receiving sensor are interchangeable.

Preferably, the determining a damage position of the boom and a corresponding first boom damage value according to the boom damage signal comprises: calculating a first damage change characteristic value of a current boom damage signal on each monitoring path in the piezoelectric sensing network relative to a corresponding initial damage signal, wherein the initial damage signal is a damage signal measured by the piezoelectric sensor before the boom operates; determining, in the case where the first damage change characteristic value is not zero, the damage position of the boom according to the first damage change characteristic value and corresponding monitoring path parameters; and calculating a second damage change characteristic value of the receiving sensor corresponding to the damage position relative to the trigger sensor, and taking the second damage change characteristic value as the first boom damage value.

Preferably, the determining the damage position of the boom according to the first damage change characteristic value and the corresponding monitoring path parameters comprises: calculating, for each monitoring path of each piezoelectric sensing network, a plurality of damage values of each receiving sensor relative to the determined trigger sensor according to the first damage change characteristic value; determining, in conjunction with the monitoring path parameters, the monitoring point corresponding to the maximum value among the plurality of damage values as an initial damage position; repeating the above steps using another piezoelectric sensor as the trigger sensor to obtain a plurality of initial damage positions until every piezoelectric sensor has been used as the trigger sensor; and determining the final damage position based on the plurality of initial damage positions.

Preferably, the determining a boom crack signal according to the optical wave values, and calculating a second boom damage value according to the boom crack signal comprises: determining the crack change factor according to the optical wave values, wherein there is a first functional relationship between the optical wave value corresponding to each optical fiber sensor and the crack change factor; determining the crack length according to the crack change factor, wherein there is a second functional relationship between the crack change factor and the crack length; and calculating the second boom damage value according to the crack length, wherein there is a third functional relationship between the crack length and the second boom damage value.

Preferably, the monitoring mechanism is further configured to: determine a residual life of the boom according to the second boom damage value, wherein there is a fourth functional relationship between the second boom damage value and the residual life of the boom.

Preferably, the piezoelectric sensing network and the optical fiber sensing network are built into a preset material adhering to an outer surface of the boom so as to be integrated with the boom.

Preferably, the piezoelectric sensing network forms a box monitoring structure for a specified structure of the boom.

Preferably, when the specified structure of the boom comprises an upper cover plate, a lower cover plate and two web plates formed between the upper cover plate and the lower cover plate, the piezoelectric sensing network comprises the following piezoelectric sensors to form the box monitoring structure: at least two piezoelectric sensors arranged on each of the upper cover plate and the lower cover plate; and at least one piezoelectric sensor arranged on each of the web plates, wherein one of the piezoelectric sensors on each of the upper cover plate and the lower cover plate serves as the trigger sensor, and the remaining piezoelectric sensors on the upper cover plate, the lower cover plate or the web plates serve as the receiving sensors.

Preferably, the plurality of optical fiber sensors of the optical fiber sensing network are connected in series and output the monitored optical wave values through a unified interface.

Preferably, for the specified structure of the boom that comprises an upper cover plate, a lower cover plate and two web plates formed between the upper cover plate and the lower cover plate, the piezoelectric sensing network comprises: at least one optical fiber sensor arranged on each web plate at a position close to the junction between the web plate and the corresponding upper cover plate or lower cover plate relative to a reference point arranged at a middle section of the boom. The optical fiber sensors on the same web are connected in series and output the monitored optical wave values through the unified interface.

Embodiments of the present invention further provide engineering machinery, comprising the boom monitoring system according to any one of the above embodiments.

Embodiments of the present invention further provide a machine-readable storage medium. The machine-readable storage medium stores an instruction used for enabling a machine to execute the boom monitoring method according to any one of the above embodiments.

According to the technical solutions above, the embodiments of the present invention monitor the structure of the boom using piezoelectric sensing and optical fiber sensing combined monitoring technology based on advantages of different monitoring technologies, thereby obviously improving monitoring efficiency and significantly enhancing reliability.

Other features and advantages of the present invention will be described in detail in the subsequent section of Detailed Description of the Embodiments.

BRIEF DESCRIPTION OF DRAWINGS

The accompanying drawings are intended to provide a further understanding of the present invention and constitute a part of the description. They are used to explain the present invention together with the Detailed Description of the Embodiments below, but are not intended to limit the present invention. In the accompanying drawings.

DESCRIPTION OF REFERENCE SIGNS

100, piezoelectric sensing network; 200, monitoring mechanism; 300, optical fiber sensing network.
101, upper cover plate; 102, lower cover plate; 103, first web; 104, second web; 105, interface outlet terminal.
1-7, piezoelectric sensor; A1-A6, optical fiber sensor; B1-B6, optical fiber sensor.

DETAILED DESCRIPTION OF THE EMBODIMENTS

Specific embodiments of the present invention will be described in detail below in conjunction with the accompanying drawings. It should be understood that the specific embodiments described herein are merely illustrative of the present invention and are not intended to limit the present invention. The present invention will be described in detail below with reference to the accompanying drawings and in conjunction with the embodiments.

Embodiment I

Figure 1:
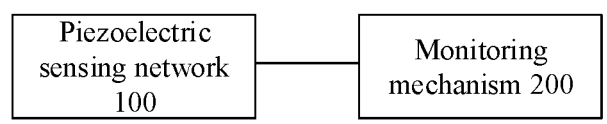
FIG. 1 is a structural schematic diagram of a boom monitoring system according to Embodiment I of the present invention.

FIG. 1 is a structural schematic diagram of a boom monitoring system according to Embodiment I of the present invention. As shown in FIG. 1, the boom monitoring system comprises: a piezoelectric sensing network 100, comprising a plurality of piezoelectric sensors arranged at different positions on a boom, wherein each piezoelectric sensor is used for acquiring a boom damage signal of the corresponding boom position; and a monitoring mechanism 200, configured to evaluate the health status of the boom according to the boom damage signal.

Wherein, the piezoelectric sensors on each monitoring path of the piezoelectric sensing network comprise a trigger sensor for sending an excitation signal and a receiving sensor for responding to the excitation signal, and the boom damage signal is a mechanical wave response signal of the receiving sensor in response to the excitation signal. That is, when the trigger sensor on the structure of the boom sends the excitation signal, the boom will send the corresponding mechanical wave response signal. When shocks and bolt looseness occur to the structure, a microcrack is generated. After the crack propagates, the magnitude and path of the mechanical wave response signal of the boom will change, resulting in the change of the damage signal.

As the mechanical wave response signal can reflect the change of the damage signal, taking the piezoelectric sensor being a piezoelectric ceramic sheet as an example, the principle of the piezoelectric sensing network 100 in the embodiment of the present invention detecting the damage is as follows: by pasting the piezoelectric ceramic sheet to the surface of a part structure to be tested, when an alternating current electric field is applied to the piezoelectric ceramic sheet, the piezoelectric ceramic sheet will vibrate due to the inverse piezoelectric effect and cause the part structure to vibrate together; the vibration of the part structure reacts on the piezoelectric ceramic sheet, and corresponding surface charges are generated under the action of the direct piezoelectric effect; and when cracks, bolt looseness and shocks/impacts occur to the structure, the vibration characteristics of the generated surface charges (i.e., the mechanical wave response signal) change accordingly, thereby realizing damage monitoring.

Further, different receiving sensors on the monitoring path have different distances from the trigger sensor, so the corresponding mechanical wave response signals have different strengths. Thus, there is an associated relationship between the distance between the piezoelectric sensors on the monitoring path and the signal strength of the corresponding mechanical wave response signal. Thereby, the damage position cam be determined according to this associated relationship, and further, the damage value can be determined, thereby completing the damage monitoring.

Therefore, when shocks/impacts, looseness or rupture of connectors (bolts, etc.) and microcracks occur to the boom, the piezoelectric sensing network 100 can acquire the boom damage signals (i.e., mechanical wave response signals) that reflect these pieces of information, and send the boom damage signals to the monitoring mechanism 200, and the monitoring mechanism 200 monitors and judges the health status of the boom. Compared with the conventional solution in which a plurality of piezoelectric sensors separately obtain piezoelectric signals to judge whether the structure is damaged, the "excitation-response" based information acquisition solution in the embodiment of the present invention focuses on the content that: the monitoring and judgment are based on a plurality of response signals in response to the change of the excitation signal in one network, so fewer piezoelectric sensors are required and the accuracy in determination of the damage position and damage value is higher.

In a preferred embodiment, the trigger sensor and the receiving sensor are interchangeable. This interchange makes the acquired mechanical wave response signals more comprehensive, which is beneficial to improving the accuracy of damage monitoring.

It can be seen that obtaining boom damage signals through the piezoelectric sensing network is the basis of the solution of Embodiment I of the present invention, so the arrangement of the piezoelectric sensing network is very important. In the embodiment of the present invention, the arrangement mode of the piezoelectric sensing network can be determined according to the structure and force characteristics of the boom. The arrangement mode comprises the number of the piezoelectric sensing networks and the number and positions of the piezoelectric sensors arranged in each piezoelectric sensing network.

For example, the piezoelectric sensing network can be arranged for a specified structure of the boom and forms a box monitoring structure for the specified structure. An example of forming the box monitoring structure may comprise: when the specified structure of the boom comprises an upper cover plate, a lower cover plate and two web plates formed between the upper cover plate and the lower cover plate, at least two piezoelectric sensors are arranged on each of the upper cover plate and the lower cover plate, and at least one piezoelectric sensor is arranged on each of the web plates; and one of the piezoelectric sensors on each of the upper cover plate and the lower cover plate is determined as the trigger sensor, and the remaining piezoelectric sensors on the upper cover plate, the lower cover plate or the web plates are determined as the receiving sensors. This example will be specifically described below with reference to FIG. 2(a) and FIG. 2(b).

Figure 2A:
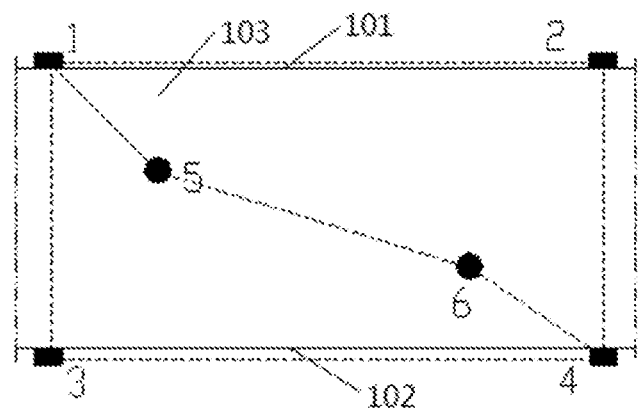
FIG. 2(a) and FIG. 2(b) are respectively a front view and a back view of arrangement of a piezoelectric sensing network in a box monitoring structure.
Figure 2B:
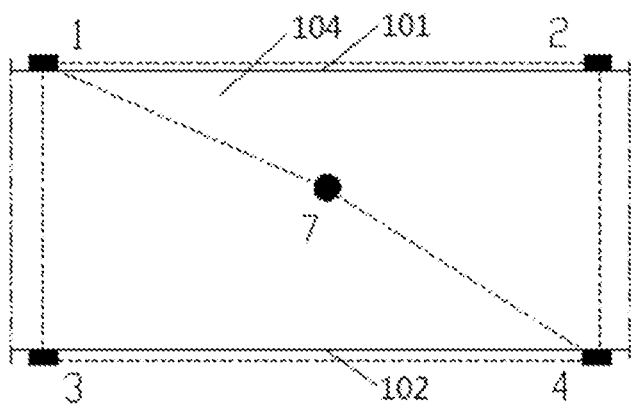
Figure 3:
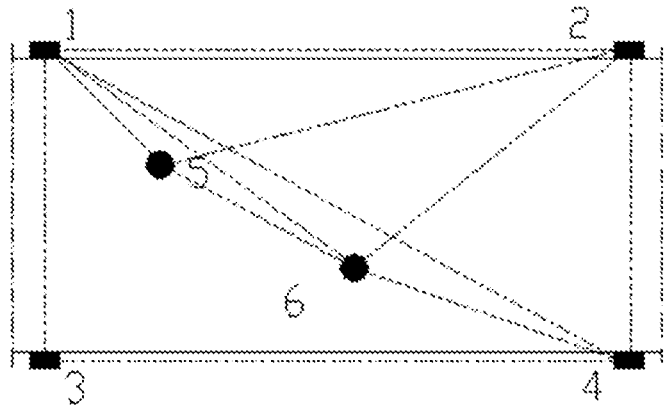
FIG. 3 shows a 1-2-4-6-5 monitoring network formed by the box monitoring structure of FIG. 2(a) and FIG. 2(b)

As a further example, FIG. 2(a) and FIG. 2(b) are respectively a front view and a back view of arrangement of a piezoelectric sensing network in a box monitoring structure. The specified structure of the boom corresponding to the box monitoring structure comprises an upper cover plate 101, a lower cover plate 102 and two web plates formed between the upper cover plate 101 and the lower cover plate 102. The two web plates comprise a first web 103 corresponding to the front of the box structure and a second web 104 corresponding to the back of the box structure, and numbers 1-7 represent the piezoelectric sensors arranged. With reference to FIG. 2(a) and FIG. 2(b), the piezoelectric sensors 1 and 2 are arranged on the upper cover plate 101, the piezoelectric sensors 3 and 4 are arranged on the lower cover plate 102, and the piezoelectric sensors 5, 6 and 7 are arranged on the web plates. The piezoelectric sensors 1 and 3 are trigger sensors that generate excitation signals, and the piezoelectric sensors 2 and 4-7 are receiving sensors that receive excitation signals and make different responses. In the actual monitoring process, the trigger sensors and the receiving sensors are interchangeable to generate different mechanical wave response signals for different excitation signals, thereby improving the accuracy of damage detection. For different structures of the boom, the piezoelectric sensors can form N networks and N monitoring paths. It is relatively simple to monitor the cover plates. The monitoring network for the cover plate is simply composed of the piezoelectric sensors 1 and 2 or the piezoelectric sensors 3 and 4, which is respectively the monitoring network for the upper cover plate or the monitoring network for the lower cover plate. Other monitoring networks are relatively complex, for example, 1-2-4-6-5, 1-3-4-6-5, 1-2-4-7, etc. Each monitoring network is composed of N monitoring paths. FIG. 3 shows a 1-2-4-6-5 monitoring network formed by the box monitoring structure of FIG. 2(a) and FIG. 2(b). It can be easily known that the 1-2-4-6-5 monitoring network is composed of nine monitoring paths. Taking each triangle as one monitoring area, it can be known that the nine monitoring paths can realize the monitoring of all areas. As a result, the seven piezoelectric sensors can realize monitoring of four surfaces of the box monitoring structure.

The specified structure of the boom to which the box monitoring structure is applicable can be, for example, a structure of a middle section of the boom. The structure of the middle section of the boom is relatively simple, and the monitoring range of the piezoelectric sensing network is large and can be up to 1.2-1.7 m. The arrangement mode for monitoring of four surfaces of the box monitoring structure through the seven monitoring points above is very suitable for monitoring within the range of 1.2-1.7 m. However, the other structures of the boom, for example, the head and tail of the boom, are relatively complex, and are typically welded from bent plates or reinforcing plates. Besides, the monitoring range of the piezoelectric sensing network used by this part of structures is generally 0.5-1 m, so the piezoelectric sensing network needs to be arranged according to the structure and force characteristics of the boom. According to the complexity of the structure, the number of the sensing networks and the number of monitoring points in each sensing network will be different, but the number of monitoring points in a single piezoelectric sensing network is generally controlled at about 4-7.

The structure and force characteristics of the boom can be obtained through finite element numerical simulation. For example, the influence of the cracks, bolt looseness and shocks/impacts of the boom on the propagation of guided waves is analyzed by finite element analysis to determine the solution for the arrangement of the piezoelectric sensing network. Then, the monitoring mechanism 200 is used to, for example, monitor the damage (looseness of connectors, cracks and shocks/impacts) of the boom through a preset piezoelectric sensing-based damage monitoring algorithm, thereby ensuring the safety of the structure of the boom. It should be noted that, the piezoelectric sensing-based damage monitoring algorithm will be described below in conjunction with examples, and will not be repeated here.

In addition, the piezoelectric sensing network can be built into a preset material adhering to an outer surface of the boom so as to be integrated with the boom. For example, the piezoelectric sensing network can be built into a carbon fiber/glass fiber material, or can be built into a resin matrix and then adhering to the metal material on the outer surface of the boom, so as to be integrated with the boom, which enables the formed boom monitoring system to have higher reliability and longer service life.

Further, the monitoring mechanism 200 can be a controller that performs all calculation and control operations or an industrial personal computer provided with the controller. The controller can be a general purpose processor, a special purpose processor, a conventional processor, a digital signal processor (DSP), a plurality of microprocessors, one or more microprocessors associated with a DSP core, a controller, a microcontroller, an application specific integrated circuit (ASIC), a field-programmable gate array (FPGA) circuit, any other type of integrated circuit (IC), a state machine, etc. When the monitoring mechanism 200 is an industrial personal computer, it can also be integrated with a remote control device to remotely send instructions to the piezoelectric sensing network or remotely receive information transmitted by the piezoelectric sensing network.

In the embodiment of the present invention, the monitoring mechanism 200 is configured to determine the health status of the boom according to the boom damage signals acquired by the piezoelectric sensing network 100, that is, to implement the piezoelectric sensing-based damage monitoring algorithm. Specifically, the monitoring mechanism 200 can be configured to:

1) calculate a first damage change characteristic value of a current boom damage signal on each monitoring path in the piezoelectric sensing network relative to a corresponding initial damage signal, wherein the initial damage signal is a damage signal measured by the piezoelectric sensor before the boom operates;
2) determine, in the case where all the first damage change characteristic values are equal to zero, that the boom is in a healthy state, otherwise, determine the damage position of the boom according to the first damage change characteristic value and corresponding monitoring path parameters;
3) calculate a second damage change characteristic value of the receiving sensor corresponding to the damage position relative to the trigger sensor; and
4) determine, if the second damage change characteristic value is greater than or equal to a preset threshold, that the boom is damaged, otherwise, determine that the boom is in the healthy state.

The implementation of the four steps will be described in detail by way of an example. In this example, the specific monitoring process performed by the monitoring mechanism 200 in the embodiment of the present invention is as follows:

(1) Before the boom operates, an initial damage signal $\theta_0(t)$ on each of monitoring paths (for example, N monitoring paths) is obtained. The initial damage signal is a mechanical wave response signal measured before the structure of the boom operates.

(2) After the boom operates for a period of time, current damage $\theta_t(t)$ on each monitoring path is obtained, and the first damage change characteristic value is calculated: $a(t)=\theta_t(t)-\theta_0(t)$.

(3) Whether a(t) is equal to zero is judged. If so, it is determined that the boom is in a healthy state and can operate safely, and the process returns to step (2). If a(t) is greater than zero, the damage position and the damage value are determined, and subsequent monitoring is carried out.

(4) The damage position of the monitoring area is determined by the following formula:

$$A(x, y) = \sum_{i=1}^{N}\sum_{j=1}^{N} A_{ij}(\omega_0, t)\left[\frac{R_r + R_t}{c_g}\right]$$

wherein A(x,y) is the amplitude of Fourier transform of the damage change value a(x,y), $A_{ij}(\omega_0,t)$ is the amplitude of Fourier transform of the first damage change characteristic value a(t) under a specific frequency $\omega_0$, $\omega_0$ is the excitation frequency, $a_{ij}$ is the damage change characteristic value (i.e., response signal) received by j with i as the excitation, $R_r$ and $R_t$ respectively represent the distance between the sensors i and j in the x-coordinate and y-coordinate (x and y refer to the coordinates (x,y) in the plane), and $c_g$ represents the transmission speed of the signal in the structure. Here, as for these parameters, except the first damage change characteristic value a(t), the remaining parameters can be collectively referred to as monitoring path parameters.

The following example will illustrate the process of determining the damage position based on the above formula. Assuming that there are 4 monitoring points in the network, then one excitation signal corresponds to 3 response signals. The respective damage values of the 3 response signals are determined through the above formula. The monitoring point with the largest A(x,y) is regarded as the possible initial damage position. Then, according to the characteristics of the respective damage values of the 3 response signals, another monitoring point is re-selected to send out an excitation signal. This process is repeated to obtain multiple maximum damage values, and the intersection of these maximum damage values is regarded as the damage position.

(5) The final damage value $a_{ij}(t)$ is determined according to the path.

For example, after the position is determined, an amount of damage of this path is calculated as the damage value of this space.

(6) Whether the structure is in the healthy state is judged:
The relationship between $a_{ij}(t)$ and $a_{threshold}$ is judged. If $a_{ij}(t)$ is greater than $a_{threshold}$, the boom is enabled to stop operating, and then is subjected to monitoring and maintenance. If $a_{ij}(t)$ is less than $a_{threshold}$, it is determined that the boom is in the healthy state and can operate normally.

It can be known from the experiments, the boom monitoring system in Embodiment I of the present invention is extremely sensitive to damage. Even if the surface of the structure of the boom is slightly pressed (for example, with the thumb), the boom monitoring system can monitor the change of the structure, and thus can accurately locate the damage. In addition, with only a small number of piezoelectric sensors, the boom monitoring system in Embodiment I of the present invention can monitor the damage (shocks/impacts, looseness of connectors, cracks, etc.) to the boom, and can determine the damage position and damage value with high accuracy, i.e., accurately realize the location of the damage of the boom, and the analysis and determination of the damage value.

Embodiment II

Figure 4:
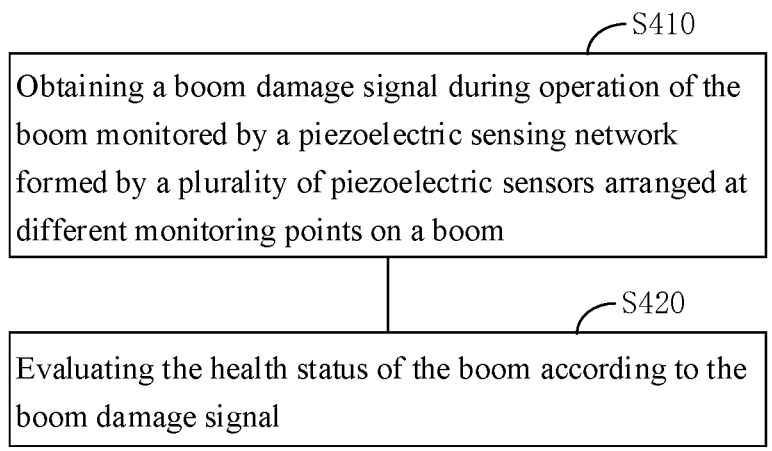
FIG. 4 is a schematic flowchart of a boom monitoring method according to Embodiment II of the present invention.

FIG. 4 is a schematic flowchart of a boom monitoring method according to Embodiment II of the present invention. This boom monitoring method is based on the same inventive idea as the boom monitoring system in Embodiment I, and can be applied to the monitoring mechanism of the boom monitoring system in Embodiment I. As shown in FIG. 4, the boom monitoring method can comprise the following steps:

Step S410: obtaining a boom damage signal monitored during operation of the boom by a piezoelectric sensing network formed by piezoelectric sensors arranged at different monitoring points on a boom.

Wherein, for the piezoelectric sensing network, reference can be made to Embodiment I, which will not be repeated here. It should be noted that the boom damage signal is a mechanical wave response signal of the receiving sensor in response to the excitation signal, and the receiving sensor and the trigger sensor that sends the excitation signal are interchangeable.

Step S420: evaluating the health status of the boom according to the boom damage signal.

Preferably, step S420 can comprise: step S421: calculating a first damage change characteristic value of a current boom damage signal on each monitoring path in the piezoelectric sensing network relative to a corresponding initial damage signal; step S422: determining, in the case where all the first damage change characteristic values are equal to zero, that the boom is in a healthy state, otherwise, determining the damage position of the boom according to the first damage change characteristic value and corresponding monitoring path parameters; step S423: calculating a second damage change characteristic value of the receiving sensor corresponding to the damage position relative to the trigger sensor; and step S424: determining, if the second damage change characteristic value is greater than or equal to a preset threshold, that the boom is damaged, otherwise, determining that the boom is in the healthy state.

More preferably, the boom monitoring method further comprises: determining an arrangement mode of the piezoelectric sensing networks according to the structure and force characteristics of the boom. Wherein, the arrangement mode comprises the number of the piezoelectric sensing networks and the number and positions of the piezoelectric sensors arranged in each piezoelectric sensing network. For example, for a specified structure of the boom, determining the arrangement mode of the piezoelectric sensing networks can comprise: determining that the piezoelectric sensing network forms a box monitoring structure for the specified structure of the boom.

For other implementation details and effects of Embodiment II, reference can be made to Embodiment I of the present invention, which will not be repeated here.

Embodiment III

Figure 5:
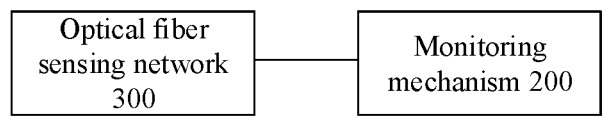
FIG. 5 is a structural schematic diagram of a boom monitoring system according to Embodiment III of the present invention.

FIG. 5 is a structural schematic diagram of a boom monitoring system according to Embodiment III of the present invention. As shown in FIG. 5, the boom monitoring system comprises: an optical fiber sensing network 300, comprising a plurality of optical fiber sensors arranged at different monitoring points on the boom, wherein each optical fiber sensor is used for monitoring an optical wave value generated by the corresponding monitoring point; and a monitoring mechanism 200, configured to determine the health status of the boom according to the optical wave values monitored by the optical fiber sensing network 300.

The optical fiber sensing network 300 can also be referred to as a fiber Bragg grating network, and the corresponding optical fiber sensor can also be referred to as a fiber Bragg grating sensor. The optical fiber sensor has the characteristics of small size, no signal drift and high stability of dynamic signals.

In addition, the optical fiber sensing network can also be built into a preset material adhering to the outer surface of the boom, like the piezoelectric sensing network in Embodiment I, so as to be integrated with the boom, which also enables the formed boom monitoring system to have higher reliability and longer service life.

According to Embodiment I above, it can be known that the boom monitoring method in Embodiment I is extremely sensitive to cracks, looseness of connectors and impacts/ruptures, that is, the piezoelectric sensing network is very sensitive to the location of the damage. However, the piezoelectric sensing network is difficult to accurately estimate the crack length and residual life of the structure, that is, the accuracy of quantitative monitoring of the piezoelectric sensing network is slightly lower. The boom monitoring system in Embodiment III of the present invention just makes up for the defect. The boom monitoring system in Embodiment III of the present invention adopts an optical fiber sensing network whose monitoring range is about 400-800 mm. The boom monitoring system in Embodiment III of the present invention can accurately monitor the crack propagation rate and the residual life of the structure, so as to give an alarm signal and provide guide for the detection and maintenance of the boom when the structure of the boom is in a dangerous state.

Figure 6A:
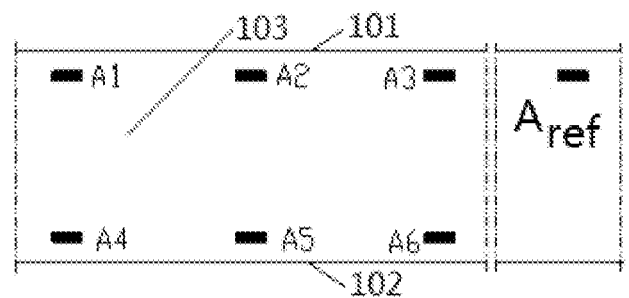
FIG. 6(a) and FIG. (6)b are respectively a front view and a back view of arrangement of an optical fiber sensing network corresponding to the box monitoring structure of FIG. 2(a) and FIG. 2(b)
Figure 6B:
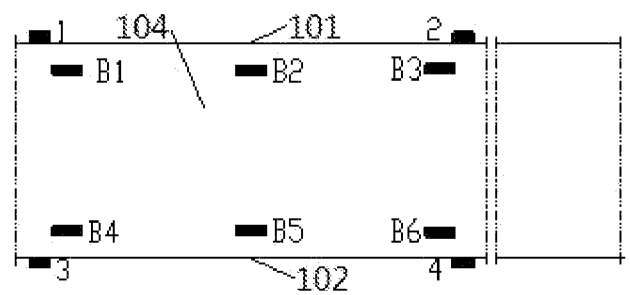

Preferably, corresponding to the box monitoring structure of FIG. 2(a) and FIG. 2(b), the determining the arrangement mode of the optical fiber sensing networks can comprise: arranging, relative to a reference point arranged at a middle section of the boom, at least one optical fiber sensor on each web plate at a position close to the junction between the web plate and the corresponding upper cover plate or lower cover plate; and enabling the optical fiber sensors on the same web plate to be connected in series and to output the monitored optical wave values through a unified interface. For example, FIG. 6(a) and FIG. 6)b are respectively a front view and a back view of arrangement of an optical fiber sensing network corresponding to the box monitoring structure of FIG. 2(a) and FIG. 2(b), wherein A1-A6 and B1-B6 represent the optical fiber sensors arranged. With reference to FIG. 6(a) and FIG. 6)b, the monitoring network A1, A2 and B1, B2 can monitor the upper cover plate 101 and the junction between the upper cover plate 101 and the corresponding web plate where the crack starts, and the corresponding monitoring network A2, A3 and B2, B3 can also monitor the upper cover plate 101 and the junction between the upper cover plate 101 and the corresponding web plate where the crack starts. The monitoring network A4, A5 and B4, B5 or the monitoring network A5, A6 and B5, B6 monitors the lower cover plate 102 and the junction between the lower cover plate 102 and the corresponding web plate where the crack starts. A1, A2, A4, A5 (A2, A3, A5, A6) and B1, B2, B4, B5 (B2, B3, B5, B6) monitor the web plates. One reference point ($A_{ref}$ in FIG. 6(a)) is arranged at the middle section of the boom to determine whether the change of the monitoring result of the optical fiber sensing network is due to the growth of cracks (caused by damage by microcracks or shocks/impacts) or the change in the force applied to the structure.

Figure 7:
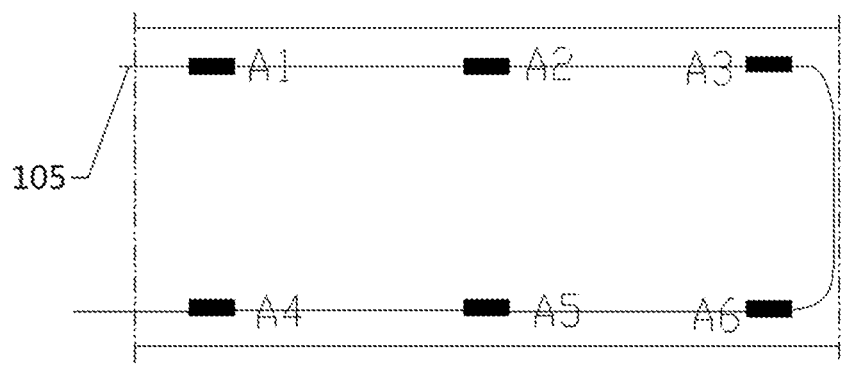
FIG. 7 is a schematic diagram of a series type optical fiber sensing network in Embodiment III of the present invention.

Further, in a preferred embodiment, the plurality of optical fiber sensors of the optical fiber sensing network are connected in series and output the monitored optical wave values through the unified interface. As shown in FIGS. 7, A1, A2, A3, A6, A5 and A4 are connected in series, and the optical wave values monitored by them are output through a unified interface outlet terminal. That is, with reference to FIG. 7, a series type optical fiber sensing network requires only one interface outlet terminal 105. One monitoring point provides one piece of data, and the propagation of the crack can be obtained by calculating the data of the plurality of monitoring points. Thus, the six signals (A1-A6) or even more signals of the multiple sensors of the entire optical fiber sensing network can be output through only one interface outlet terminal. In the conventional solution that uses strain gauges to monitor cracks, each strain gauge needs to correspond to one interface, and it is not convenient to monitor a large number of signals. The embodiment of the present invention solves this problem by using the series type optical fiber sensing network.

In addition, like Embodiment I, the arrangement mode of the optical fiber sensing networks also comprises the number of the optical fiber sensing networks and the number and positions of the optical fiber sensors arranged in each optical fiber sensing network, which can be determined according to specific demands.

In the embodiment of the present invention, the monitoring mechanism 200 is configured to determine the health status of the boom according to the optical wave values monitored by the optical fiber sensing network 300, which can specifically comprise executing the following operations:

1) obtaining the optical wave values monitored by the plurality of optical fiber sensors for each optical fiber sensing network.
2) determining a crack change factor according to the optical wave values, wherein there is a first functional relationship between the optical wave value corresponding to each optical fiber sensor and the crack change factor.

Taking the monitoring network A1, A2 and B1, B2 as an example, A1, A2, B1, B2 and $A_{ref}$ form a monitoring network. Through the judgment on the five reference points, a relationship between the crack length l and the optical wave value of the monitoring point can be determined. This relationship is represented by K-l, wherein K is the crack change factor. The crack change factor K satisfies the first functional relationship below:

$$K = \mu f(\rho_m, \rho_n, \rho_f, \rho_g, \rho_{ref}) + b,$$

wherein $\rho_m$ is the optical wave value corresponding to A1, $\rho_n$ is the optical wave value corresponding to A2, $\rho_f$ is the optical wave value corresponding to B1, $\rho_g$ is the optical wave value corresponding to B2, μ and b are correction coefficients, and $\rho_{ref}$ is the optical wave value of the reference point.

3) determining the crack length according to the crack change factor, wherein there is a second functional relationship between the crack change factor and the crack length.

In this example, a large number of experiments and finite element simulations prove that the crack change factor K and the crack length l have a functional relationship, and at this time, satisfy the second functional relationship:

$$l=xf(K)+t,$$

wherein x and t are correction coefficients. Thereby, when the crack change factor K is determined, the crack length l can be obtained by the inverse operation.

4) calculating a boom damage value according to the crack length, wherein there is a third functional relationship between the crack length and the boom damage value.

The crack length l is determined by the change of the crack change factor K, and the boom damage value monitored by the optical fiber monitoring network is determined by the crack length l. Taking the upper cover plate of the boom as an example, the boom damage value a(t) and the crack length l satisfy the third functional relationship:

$$a(t)=kf(l_t(t),b,N_u)+w$$

wherein b is the width of the upper cover plate, $N_u$ is the operation time (service life) of the boom, $l_t(t)$ is the crack length that changes with time (number of cycles), and k and w are correction coefficients.

5) determining the health status of the boom according to the boom damage signal.

For example, the relationship between a(t) and $a_{threshold}$ is judged. If a(t) is greater than $a_{threshold}$, it is determined that the boom is in an unhealthy state, and the boom is enabled to stop operating, and then is subjected to monitoring and maintenance. If a(t) is less than $a_{threshold}$, it is determined that the boom is in the healthy state and can operate normally.

6) determining a residual life of the boom according to the boom damage value, wherein there is a fourth functional relationship between the boom damage value and the residual life of the boom.

For example, the residual life $N_f$ of the boom is related to the crack propagation rate dl/dN, and its specific value can be converted from the damage value. Assuming that the design life is $N_t$, the residual life satisfies the fourth functional relationship below:

$$N_f = \frac{D - a(t)}{D} N_t$$

wherein D is the total damage value of the boom, which is selected from 0.4 to 1.

Further, based on the calculated residual life, if the residual life is lower than the threshold which indicates that the boom is in a dangerous state, the boom monitoring system will give an alarm and provide guide for the detection and maintenance of the boom.

Combining steps 1) to 6), the specific monitoring process performed by the monitoring mechanism 200 is as follows:

(1) Preliminary warning determination and determination of monitoring time step: If the crack change factor is greater than the set threshold, it is judged whether the crack cause is consistent with the actual situation according to the corresponding optical wave value; and if the crack cause is consistent with the actual situation, the monitoring time step of the corresponding optical fiber sensor is determined according to the optical wave value.

For example, the optical wave value of the reference point is monitored and determined for its size, and it is judged whether the crack cause is consistent with the actual situation according to the optical wave value. If so, the boom continues operating, and if not, the boom stops operating.

The judging whether the crack cause is consistent with the actual situation according to the optical wave value comprises: for each optical fiber sensing network, judging whether the crack cause is the increase of the crack length or the change in the force applied to the structure according to the comparison result between the optical wave value monitored by each optical fiber sensor and the optical wave value of the corresponding optical fiber sensor at the reference point in the optical fiber sensing network. The change in the force applied to the structure indicates that the increase of the crack change factor is due to the large external load, and the increase of the crack length indicates that the increase of the crack change factor is due to a larger damage that may have occurred. For example, according to the comparison result, the optical wave value may be too small, which is possibly related to the crack cause, which is specifically expressed as: if the crack cause is consistent with the actual situation (normal situation), the force applied to the boom is small; and if the crack cause is not consistent with the actual situation (abnormal situation), the crack is too large, and the optical wave propagation signal value is small.

Further, as for the determination of the monitoring time step, for example, after the preliminary warning determination is completed, if the value at the reference point is greater, then the force applied to the boom is large, and the monitoring time step is relatively short; if the value at the reference point is smaller, then the force applied to the boom is small, and the monitoring time step is relatively long. For a further example, if it is determined that the force applied to the boom is large, the monitoring time step of the optical fiber sensing network is modified from four hours to two hours to adapt to the actual situation. The actual situation here can be understood as whether the large crack change factor is due to the large external load or the large damage that has occurred (increase in the crack length). If the large crack change factor is due to the large damage that has occurred, then it is considered that the crack cause determined corresponding to the optical wave value is consistent with the actual situation.

(2) Determination of warning diagnosis: After the boom damage value is obtained, when the boom damage value is less than the set threshold, the next monitoring time step of the corresponding optical fiber sensor can be adjusted according to the boom damage value.

For example, if the damage value a(t) is greater (for example, greater than the threshold), the boom stops operating; and if the damage value a(t) is smaller, the boom continues operating. The next monitoring time step is adjusted according to the size of a(t). For example, $a_i(t)$ is compared with $a_{i-1}(t)$ of the previous monitoring time step. If the difference is large, the change value of the two values is compared with a specific parameter table on monitoring duration, and the calculation can be carried out from every 2 hours (conventional monitoring duration) to every 1 hour.

(3) According to the result of step (2), the monitoring time step in step (1) is adjusted, then the determination in step (2) is carried out. This process is repeated.

(4) After the equipment stops operating for restarting or attitude adjustment, it is required to restart from the preliminary warning determination in step (1).

(5) Whether the structure is in a safe state is judged: The relationship between a(t) and $a_{threshold}$ is judged. If a(t) is greater than $a_{threshold}$, the boom is enabled to stop operating and is subjected to monitoring and maintenance. If a(t) is less than $a_{threshold}$, step (1) is carried out, and the boom operates normally.

In summary, by adopting the optical fiber sensing network, the boom monitoring system in the embodiment of the present invention can accurately evaluate the crack length and the residual life of the boom after the damage reaches a certain level or even when a microcrack occurs, thereby providing a quantitative solution for the detection and maintenance cycle of the boom.

Embodiment IV

Figure 8:
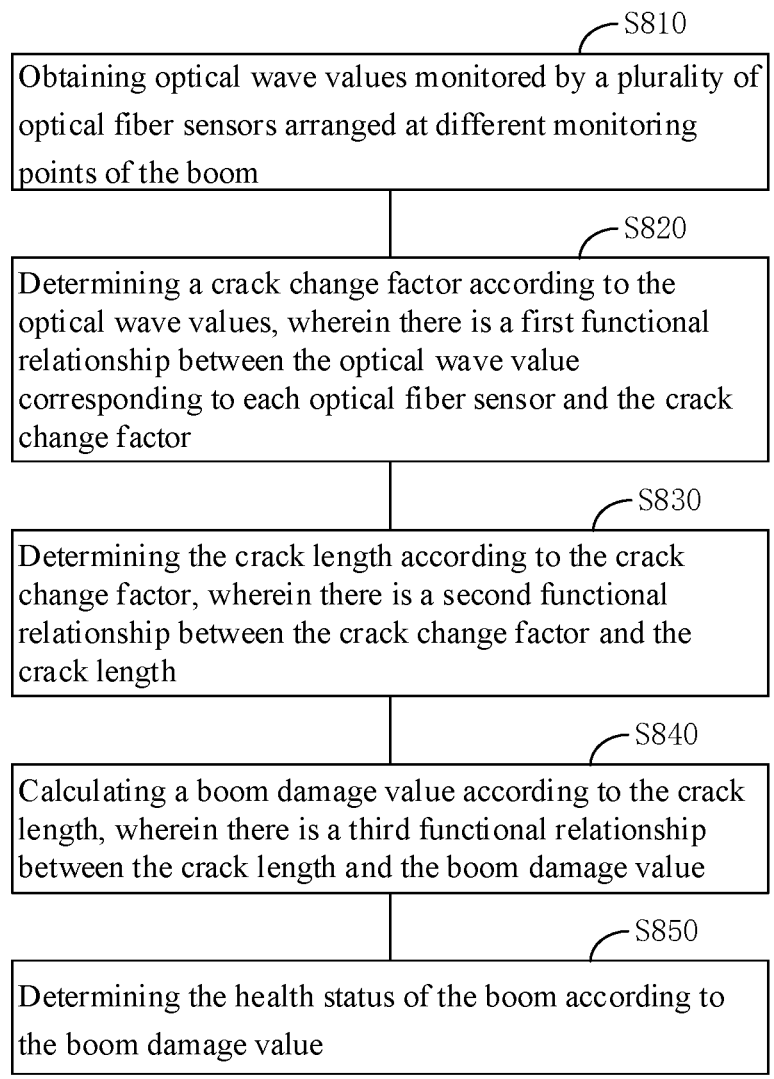
FIG. 8 is a schematic flowchart of a boom monitoring method according to Embodiment IV of the present invention.

FIG. 8 is a schematic flowchart of a boom monitoring method according to Embodiment IV of the present invention. This boom monitoring method is based on the same inventive idea as the boom monitoring system in Embodiment III, and can be applied to the monitoring mechanism of the boom monitoring system in Embodiment III. As shown in FIG. 8, the boom monitoring method can comprise the following steps:

Step S810: obtaining optical wave values monitored by a plurality of optical fiber sensors arranged at different monitoring points of the boom. Wherein the plurality of optical fiber sensors form an optical fiber sensing network.

Step S820: determining a crack change factor according to the optical wave values, wherein there is a first functional relationship between the optical wave value corresponding to each optical fiber sensor and the crack change factor.

Step S830: determining a crack length according to the crack change factor, wherein there is a second functional relationship between the crack change factor and the crack length.

Step S840: calculating a boom damage value according to the crack length, wherein there is a third functional relationship between the crack length and the boom damage value.

Step S850: determining the health status of the boom according to the boom damage value.

In a preferred embodiment, the boom monitoring method further comprises: when the crack change factor is greater than the set threshold, judging whether the crack cause is consistent with the actual situation according to the corresponding optical wave value; and when the crack cause is consistent with the actual situation, determining the monitoring time step of the corresponding optical fiber sensor according to the optical wave value.

Preferably, the judging whether the crack cause is consistent with the actual situation according to the optical wave value comprises: for each optical fiber sensing network, judging whether the crack cause is the increase of the crack length or the change in the force applied to the structure according to the comparison result between the optical wave value monitored by each optical fiber sensor and the optical wave value of the corresponding optical fiber sensor at the reference point in the optical fiber sensing network, and if the crack cause is the increase of the crack length, determining that the crack cause is consistent with the actual situation.

In a preferred embodiment, the boom monitoring method further comprises: when the boom damage value is less than the set threshold, adjusting the next monitoring time step of the corresponding optical fiber sensor according to the boom damage value. In a preferred embodiment, the boom monitoring method further comprises: determining a residual life of the boom according to the boom damage value, wherein there is a fourth functional relationship between the boom damage value and the residual life of the boom.

For other implementation details and effects of Embodiment IV, reference can be made to Embodiment III of the present invention, which will not be repeated here.

Embodiment V

Embodiment I and Embodiment III respectively use the piezoelectric sensing network and the optical fiber sensing network to monitor the health status of the boom, and have their respective advantages. For example, the system using the optical fiber sensing network in Embodiment III has higher accuracy in monitoring crack propagation than the system using the piezoelectric sensing network in Embodiment I, and the system in Embodiment I has poor online real-time monitoring performance and is more suitable for regular monitoring. For another example, the system using the piezoelectric sensing network in Embodiment I is extremely sensitive to cracks, looseness of connectors and impacts/ruptures, i.e., very sensitive to the location of the damage, but has difficulty in accurately estimating the crack length and the residual life of the structure, that is, the accuracy of quantitative monitoring is slightly lower. The system using the optical fiber sensing network in Embodiment III just makes up for the defect, so as to enhance the diagnostic capability of the monitoring system.

In addition, the boom is subjected to vibrations, impacts and other actions for a long time during use, so the form of force applied to the boom is extremely complex. For different types of engineering machinery, the cracking position of the boom is slightly different. Some cracking positions may be concentrated on the head or tail where the booms are connected, or on the middle section of the boom, or even on every part of the boom. Different forms of force require different forms of monitoring and sensing networks and different monitoring methods. Moreover, engineering machinery and equipment typically use a long boom whose length ranges from several meters to a dozen meters, and it is basically difficult to monitor the health status of the whole boom.

Figure 9:
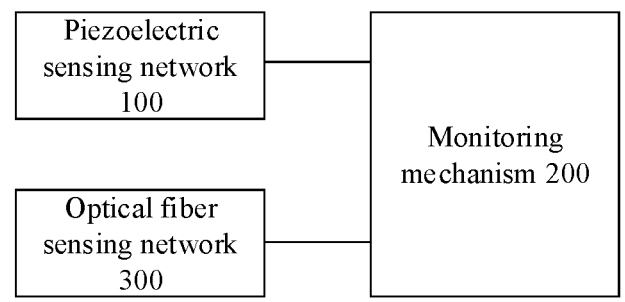
FIG. 9 is a structural schematic diagram of a boom monitoring system according to Embodiment V of the present invention.

Therefore, based on the respective advantages of the boom monitoring methods in Embodiment I and Embodiment III and the actual use condition of the boom, in order to further optimize the sensing network layout, increase the accuracy in locating and evaluating damage and enhance the safety of the monitoring system, Embodiment V of the present invention provides a solution of arranging both the optical fiber sensing network and the piezoelectric sensing network on the boom, thereby providing more accurate guide for real-time detection and maintenance of the boom. FIG. 9 is a structural schematic diagram of a boom monitoring system according to Embodiment V of the present invention. The boom monitoring system can comprise: a piezoelectric sensing network 100, comprising a plurality of piezoelectric sensors arranged at different monitoring points on a boom, wherein each piezoelectric sensor is used for monitoring a boom damage signal of the corresponding monitoring point; an optical fiber sensing network 300, comprising a plurality of optical fiber sensors arranged at different monitoring points on the boom, wherein each optical fiber sensor is used for monitoring an optical wave value generated by the corresponding monitoring point; and a monitoring mechanism 200.

Figure 10A:
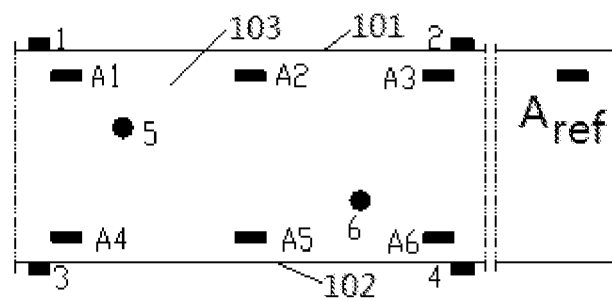
FIG. 10(*a*) and FIG. 10(*b*) are schematic diagrams of combined arrangement of a piezoelectric sensing network and an optical fiber sensing network in Embodiment V of the present invention.
Figure 10B:
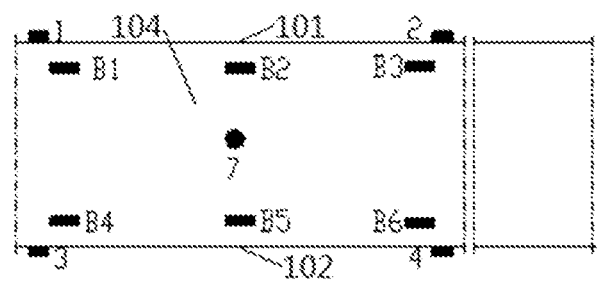

For the implementation details of the piezoelectric sensing network 100 and the optical fiber sensing network 300, reference can be made to Embodiment I and Embodiment III respectively, which will not be repeated here. However, the arrangement modes of the piezoelectric sensing network 100 and the optical fiber sensing network 300 can be taken into account together. For example, with reference to the piezoelectric sensing network in the box monitoring structure in FIG. 2(*a*) and FIG. 2(*b*) and the series-type optical fiber sensing network in FIG. 6(*a*) and FIG. 6(*b*) together, the optical fiber sensing network can be arranged in the piezoelectric sensing network, and an effect of combined arrangement of the piezoelectric sensing network and the optical fiber sensing network is shown in FIG. 10(*a*) and FIG. 10(*b*). In addition, according to the actual monitoring needs, this combined arrangement also needs to take the respective numbers of the piezoelectric sensing networks 100 and the optical fiber sensing networks 300 into account. For example, in a key monitoring area, one piezoelectric sensing network and two optical fiber sensing networks can be arranged. When a microcrack of the structure is accurately detected by the piezoelectric sensing network, the optical fiber sensing networks start monitoring, and the piezoelectric and optical fiber sensing networks are combined to accurately monitor the structure of the boom for its safety.

Further, the monitoring mechanism 200 is configured to: 1) obtain a boom damage signal monitored during operation of the boom by the piezoelectric sensing network; 2) determine a damage position of the boom and a corresponding first boom damage value according to the boom damage signal.

Preferably, this step can comprise: calculating a first damage change characteristic value of a current boom damage signal on each monitoring path in the piezoelectric sensing network relative to a corresponding initial damage signal, wherein the initial damage signal is a damage signal measured by the piezoelectric sensor before the boom operates; determining, in the case where the first damage change characteristic value is not zero, the damage position of the boom according to the first damage change characteristic value and corresponding monitoring path parameters; and calculating a second damage change characteristic value of the receiving sensor corresponding to the damage position relative to the trigger sensor, and taking the second damage change characteristic value as the first boom damage value.

For the specific calculation process, reference can be made to the specific monitoring process performed by the monitoring mechanism in Embodiment I, which will not be repeated here.

3) obtain, when the first boom damage value reaches a preset starting value of the optical fiber sensing network, optical wave values of the corresponding monitoring points monitored by the optical fibers sensors.

For example, assuming the preset starting value of the optical fiber sensing network is $a_{start}$, then it is judged whether the first boom damage value obtained based on the piezoelectric sensing network reaches $a_{start}$. If so, the optical fiber sensing network is started.

4) determine a boom crack signal comprising the crack change factor and the crack length according to the optical wave value, and calculate a second boom damage value according to the boom crack signal.

With reference to Embodiment III, this step can specifically comprise: determining the crack change factor according to the optical wave values, wherein there is a first functional relationship between the optical wave value corresponding to each optical fiber sensor and the crack change factor; determining the crack length according to the crack change factor, wherein there is a second functional relationship between the crack change factor and the crack length; and calculating the second boom damage value according to the crack length, wherein there is a third functional relationship between the crack length and the second boom damage value.

Preferably, after the second boom damage value is calculated, the residual life of the boom can be further determined according to the second boom damage value, wherein there is a fourth functional relationship between the second boom damage value and the residual life of the boom.

More preferably, the monitoring mechanism 200 is further configured to: control the motion of the boom according to the comparison result between the second boom damage value and a set safety threshold. For example, when the second boom damage value reaches the set safety threshold, the motion of the boom is stopped.

For the specific calculation processes involving the four functional relationships above, reference can be made to the specific monitoring process performed by the monitoring mechanism in Embodiment III, which will not be repeated here.

In addition, since the optical fiber sensor and the piezoelectric sensor are based on different monitoring principles, the advantages of the sensors can be exerted in one monitoring activity, and thus, multiple types of data on the structure of the boom can be monitored on the same terminal. The monitoring mechanism composed of a computer program and a multi-expert system can carry out comprehensive diagnosis and damage evaluation on the monitored target. It should be noted that different sensors can be connected with each other using network interfaces, and the sensors can also be remotely controlled to acquire data, so as to realize remote monitoring and improve monitoring efficiency. According to Embodiment V of the present invention, by integrating the systems using different sensors, the formed boom monitoring system is stronger in functionality than the monitoring system using a single type of sensors and is easy to expand.

Therefore, the solution of evaluating the damage of the boom by combining piezoelectric sensing and optical fiber sensing in Embodiment V has the following effects: the piezoelectric sensing network, which is extremely sensitive to the damage, can accurately locate the damage; and after the damage reaches a certain level or even when a microcrack occurs, it is necessary to accurately evaluate the crack length and the residual life of the structure, and the optical fiber sensing network, which is obviously advantageous at this time, can accurately evaluate the residual life of the structure, thereby providing a quantitative solution for the detection and maintenance cycle of the boom. Therefore, the boom monitoring solution in Embodiment V of the present invention exerts the respective advantages of optical fiber sensing and piezoelectric sensing, thereby obviously improving monitoring efficiency and significantly enhancing reliability on the premise of using fewer sensing elements.

In summary, Embodiment V of the present invention monitors the structure of the boom using piezoelectric sensing and optical fiber sensing combined monitoring technology based on advantages of different monitoring technologies, thereby obviously improving monitoring efficiency and significantly enhancing reliability.

Embodiment VI

Figure 11:
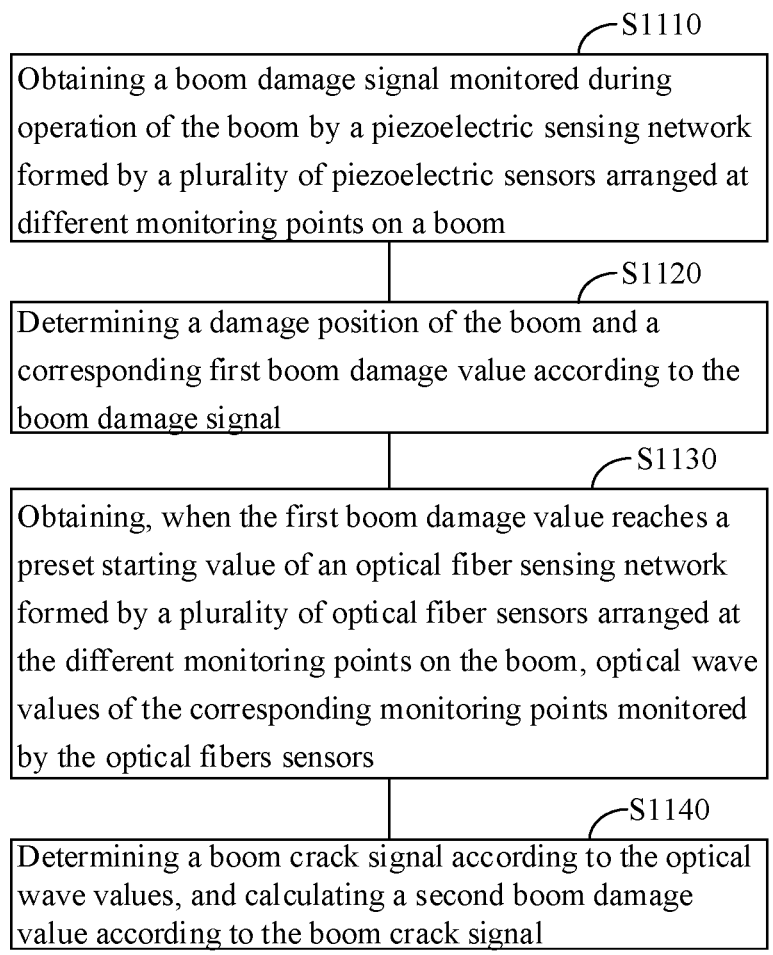
FIG. 11 is a schematic flowchart of a boom monitoring method according to Embodiment VI of the present invention.

FIG. 11 is a schematic flowchart of a boom monitoring method according to Embodiment VI of the present invention. This boom monitoring method is based on the same inventive idea as the boom monitoring system in Embodiment V, and can be applied to the monitoring mechanism of the boom monitoring system in Embodiment V. As shown in FIG. 11, the boom monitoring method can comprise the following steps:

Step S1110: obtaining a boom damage signal monitored during operation of the boom by a piezoelectric sensing network formed by a plurality of piezoelectric sensors arranged at different monitoring points on a boom.

Step S1120: determining a damage position of the boom and a corresponding first boom damage value according to the boom damage signal.

Preferably, step S1120 can comprise: calculating a first damage change characteristic value of a current boom damage signal on each monitoring path in the piezoelectric sensing network relative to a corresponding initial damage signal, wherein the initial damage signal is a damage signal measured by the piezoelectric sensor before the boom operates; determining, in the case where the first damage change characteristic value is not zero, the damage position of the boom according to the first damage change characteristic value and corresponding monitoring path parameters; and calculating a second damage change characteristic value of the receiving sensor corresponding to the damage position relative to the trigger sensor, and taking the second damage change characteristic value as the first boom damage value.

Step S1130: obtaining, when the first boom damage value reaches a preset starting value of an optical fiber sensing network formed by a plurality of optical fiber sensors arranged at the different monitoring points on the boom, optical wave values of the corresponding monitoring points monitored by the optical fibers sensors.

Step S1140: determining a boom crack signal according to the optical wave values, and calculating a second boom damage value according to the boom crack signal, wherein the boom crack signal comprises a crack change factor and a crack length.

Preferably, step S1140 can comprise: determining the crack change factor according to the optical wave values, wherein there is a first functional relationship between the optical wave value corresponding to each optical fiber sensor and the crack change factor; determining the crack length according to the crack change factor, wherein there is a second functional relationship between the crack change factor and the crack length; and calculating the second boom damage value according to the crack length, wherein there is a third functional relationship between the crack length and the second boom damage value.

In a preferred embodiment, the boom monitoring method further comprises: determining a residual life of the boom according to the second boom damage value, wherein there is a fourth functional relationship between the second boom damage value and the residual life of the boom. In a preferred embodiment, the boom monitoring method further comprises: controlling the motion of the boom according to the comparison result between the second boom damage value and a set safety threshold.

In a preferred embodiment, the boom monitoring method further comprises: determining arrangement modes of the piezoelectric sensing networks and the optical fiber sensing networks, comprising any one or more of: 1) determining respective numbers and arrangement areas of the piezoelectric sensing networks and the optical fiber sensing networks; 2) determining the arrangement mode of the piezoelectric sensing network, comprising enabling the piezoelectric sensing network to form a box monitoring structure for a specified structure of the boom; and 3) determining the arrangement mode of the optical fiber sensing network, comprising enabling the plurality of optical fiber sensors of the optical fiber sensing network to be connected in series and to output the monitored optical wave values through a unified interface.

For other implementation details and effects of Embodiment VI, reference can be made to Embodiment V of the present invention, which will not be repeated here.

Other embodiments of the present invention further provide engineering machinery, comprising the boom monitoring system according to any one of Embodiment I, Embodiment III and Embodiment V. The engineering machinery is, for example, a crane, an excavator, etc.

Other embodiments of the present invention further provide a machine-readable storage medium. The machine-readable storage medium stores an instruction thereon for enabling a machine to execute the boom monitoring method according to any one of Embodiments II, IV and VI.

Optional implementations of the embodiments of the present invention have been described in detail above in conjunction with the accompanying drawings, but the embodiments of the present invention are not limited to the specific details in the above embodiments. Various simple variations can be made to the technical solutions of the embodiments of the present invention within the scope of the technical idea of the embodiments of the present invention, and these simple variations are all within the protection scope of the embodiments of the present invention. It should be further noted that the specific technical features described in the above specific embodiments can be combined in any suitable manner in the case of no contradiction. In order to avoid unnecessary repetition, the embodiments of the present invention will not be further described in various possible combinations.

Those skilled in the art can understand that all or part of the steps in the method of the above embodiments can be implemented by instructing relevant hardware through a program. The program is stored in a storage medium, and comprises several instructions to enable a single-chip microcomputer, chip or processor to execute all or part of the steps of the method in the embodiments of the present application. The foregoing storage medium comprises: a USB flash disk, a mobile hard disk, a read-only memory (ROM), a random access memory (RAM), a magnetic disk, an optical disk, or any medium that can store program codes.

In addition, the various implementations of the embodiments of the present invention can be arbitrarily combined as long as it does not deviate from the idea of the embodiments of the present invention, and it should also be regarded as the contents disclosed by the embodiments of the present invention.

The invention claimed is:

1. A boom monitoring method, wherein the method is applied to a monitoring mechanism, and the method comprises:

during operation of the boom, obtaining a boom damage signal monitored by a piezoelectric sensing network formed by a plurality of piezoelectric sensors arranged at different monitoring points on a boom;

determining a damage position of the boom and a corresponding first boom damage value according to the boom damage signal;

obtaining, when the first boom damage value reaches a preset starting value of an optical fiber sensing network formed by a plurality of optical fiber sensors arranged at different monitoring points on the boom, optical wave values of the corresponding monitoring points monitored by the optical fibers sensors; and determining a boom crack signal according to the optical wave values, and calculating a second boom damage value according to the boom crack signal, wherein the boom crack signal comprises a crack change factor and a crack length.

2. The boom monitoring method according to claim 1, wherein the piezoelectric sensors on each monitoring path of the piezoelectric sensing network comprise a trigger sensor for sending an excitation signal and a receiving sensor for responding to the excitation signal, the boom damage signal is a mechanical wave response signal sent by the receiving sensor in response to the excitation signal, and the trigger sensor and the receiving sensor are interchangeable.

3. The boom monitoring method according to claim 2, wherein the determining a damage position of the boom and a corresponding first boom damage value according to the boom damage signal comprises:

calculating a first damage change characteristic value of a current boom damage signal on each monitoring path in the piezoelectric sensing network relative to a corresponding initial damage signal, wherein the initial damage signal is a damage signal measured by the piezoelectric sensor before the boom operates;

determining, in the case where the first damage change characteristic value is not zero, the damage position of the boom according to the first damage change characteristic value and corresponding monitoring path parameters; and calculating a second damage change characteristic value at the damage position, and taking the second damage change characteristic value as the first boom damage value.

4. The boom monitoring method according to claim 3, wherein the determining the damage position of the boom according to the first damage change characteristic value and corresponding monitoring path parameters comprises:

calculating, for each monitoring path of each piezoelectric sensing network, a plurality of damage values of each receiving sensor relative to a preselected trigger sensor according to the first damage change characteristic value;

determining, in conjunction with the monitoring path parameters, the monitoring point corresponding to the maximum value among the plurality of damage values as an initial damage position;

repeating the above steps by reselecting another piezoelectric sensor as the trigger sensor to obtain a plurality of initial damage positions until every piezoelectric sensor has been used as the trigger sensor; and determining a final damage position based on the plurality of initial damage positions.

5. The boom monitoring method according to claim 1, wherein the determining a boom crack signal according to the optical wave values, and calculating a second boom damage value according to the boom crack signal comprises:

determining the crack change factor according to the optical wave values, wherein there is a first functional relationship between the optical wave value corresponding to each optical fiber sensor and the crack change factor;

determining the crack length according to the crack change factor, wherein there is a second functional relationship between the crack change factor and the crack length; and calculating the second boom damage value according to the crack length, wherein there is a third functional relationship between the crack length and the second boom damage value; and determining a residual life of the boom according to the second boom damage value, wherein there is a fourth functional relationship between the second boom damage value and the residual life of the boom.

6. The boom monitoring method according to claim 1, wherein the method further comprises:

determining arrangement modes of the piezoelectric sensing network and the optical fiber sensing network, comprising any one or more of:

determining respective numbers and arrangement areas of the piezoelectric sensing networks and the optical fiber sensing networks;

determining the arrangement mode of the piezoelectric sensing network, comprising enabling the piezoelectric sensing network to form a box monitoring structure for a specified structure of the boom; and determining the arrangement mode of the optical fiber sensing network, comprising enabling the plurality of optical fiber sensors of the optical fiber sensing network to be connected in series and to output the monitored optical wave values through a unified interface.

7. The boom monitoring method according to claim 6, wherein determining the arrangement mode of the piezoelectric sensing network to enable the piezoelectric sensing network to form a box monitoring structure for a specified structure of the boom comprises:

arranging, when the specified structure of the boom comprises an upper cover plate, a lower cover plate and two web plates formed between the upper cover plate and the lower cover plate, at least two piezoelectric sensors on each of the upper cover plate and the lower cover plate, and arranging at least one piezoelectric sensor on each of the web plates; and determining one of the piezoelectric sensors on each of the upper cover plate and the lower cover plate as the trigger sensor, and determining the remaining piezoelectric sensors on the upper cover plate, the lower cover plate or the web plates as the receiving sensors.

8. The boom monitoring method according to claim 6, wherein determining the arrangement mode of the optical fiber sensing network to enable the plurality of optical fiber sensors of the optical fiber sensing network to be connected in series and to output the monitored optical wave values through a unified interface comprises:

arranging, when the specified structure of the boom comprises an upper cover plate, a lower cover plate and two web plates formed between the upper cover plate and the lower cover plate, at least one optical fiber sensor on each web plate at a position close to the junction between the web plate and the corresponding upper cover plate or lower cover plate relative to a reference point arranged at a middle section of the boom; and enabling the optical fiber sensors on the same web plates to be connected in series and to output the monitored optical wave values through the unified interface.

9. A boom monitoring system, wherein the system comprises:
a piezoelectric sensing network, comprising a plurality of piezoelectric sensors arranged at different monitoring points on a boom, wherein each piezoelectric sensor is used for monitoring a boom damage signal of the corresponding monitoring point;
an optical fiber sensing network, comprising a plurality of optical fiber sensors arranged at the different monitoring points on the boom, wherein each optical fiber sensor is used for monitoring an optical wave value of the corresponding monitoring point; and
a monitoring mechanism, configured to:
obtain a boom damage signal monitored by the piezoelectric sensing network during operation of the boom;
determine a damage position of the boom and a corresponding first boom damage value according to the boom damage signal;
obtain, when the first boom damage value reaches a preset starting value of the optical fiber sensing network, optical wave values of the corresponding monitoring points monitored by the optical fibers sensors; and
determine a boom crack signal according to the optical wave values, and calculate a second boom damage value according to the boom crack signal, wherein the boom crack signal comprises a crack change factor and a crack length.

10. The boom monitoring system according to claim 9, wherein the piezoelectric sensors on each monitoring path of the piezoelectric sensing network comprise a trigger sensor for sending an excitation signal and a receiving sensor for responding to the excitation signal, the boom damage signal is a mechanical wave response signal sent by the receiving sensor in response to the excitation signal, and the trigger sensor and the receiving sensor are interchangeable.

11. The boom monitoring system according to claim 10, wherein the determining a damage position of the boom and a corresponding first boom damage value according to the boom damage signal comprises:
calculating a first damage change characteristic value of a current boom damage signal on each monitoring path in the piezoelectric sensing network relative to a corresponding initial damage signal, wherein the initial damage signal is a damage signal measured by the piezoelectric sensor before the boom operates;
determining, in the case where the first damage change characteristic value is not zero, the damage position of the boom according to the first damage change characteristic value and corresponding monitoring path parameters; and
calculating a second damage change characteristic value at the damage position, and taking the second damage change characteristic value as the first boom damage value.

12. The boom monitoring system according to claim 11, wherein the determining the damage position of the boom according to the first damage change characteristic value and corresponding monitoring path parameters comprises:
calculating, for each monitoring path of each piezoelectric sensing network, a plurality of damage values of each receiving sensor relative to a preselected trigger sensor according to the first damage change characteristic value;
determining, in conjunction with the monitoring path parameters, the monitoring point corresponding to the maximum value among the plurality of damage values as an initial damage position;
repeating the above steps by reselecting another piezoelectric sensor as the trigger sensor to obtain a plurality of initial damage positions until every piezoelectric sensor has been used as the trigger sensor; and
determining a final damage position based on the plurality of initial damage positions.

13. The boom monitoring system according to claim 9, wherein the determining a boom crack signal according to the optical wave values, and calculating a second boom damage value according to the boom crack signal comprises:
determining the crack change factor according to the optical wave values, wherein there is a first functional relationship between the optical wave value corresponding to each optical fiber sensor and the crack change factor;
determining the crack length according to the crack change factor, wherein there is a second functional relationship between the crack change factor and the crack length; and
calculating the second boom damage value according to the crack length, wherein there is a third functional relationship between the crack length and the second boom damage value.

14. The boom monitoring system according to claim 13, wherein the monitoring mechanism is further configured to:
determine a residual life of the boom according to the second boom damage value, wherein there is a fourth functional relationship between the second boom damage value and the residual life of the boom.

15. The boom monitoring system according to claim 9, wherein the piezoelectric sensing network and the optical fiber sensing network are built into a preset material layer adhering to an outer surface of the boom so as to be integrated with the boom.

16. The boom monitoring system according to claim 9, wherein the piezoelectric sensing network forms a box monitoring structure for a specified structure of the boom; and
when the specified structure of the boom comprises an upper cover plate, a lower cover plate and two web plates formed between the upper cover plate and the lower cover plate, the piezoelectric sensing network comprises the following piezoelectric sensors to form the box monitoring structure:
at least two piezoelectric sensors arranged on each of the upper cover plate and the lower cover plate; and
at least one piezoelectric sensor arranged on each of the web plates;
wherein one of the piezoelectric sensors on each of the upper cover plate and the lower cover plate serves as the trigger sensor, and the remaining piezoelectric sensors on the upper cover plate, the lower cover plate or the web plates serve as the receiving sensors.

17. The boom monitoring system according to claim 9, wherein the plurality of optical fiber sensors of the optical fiber sensing network are connected in series and output the monitored optical wave values through a unified interface.

18. The boom monitoring system according to claim 17, wherein for the specified structure of the boom that comprises an upper cover plate, a lower cover plate and two web plates formed between the upper cover plate and the lower cover plate, the piezoelectric sensing network comprises:

at least one optical fiber sensor arranged on each web plate at a position close to the junction between the web plate and the corresponding upper cover plate or lower cover plate relative to a reference point arranged at a middle section of the boom; wherein the optical fiber sensors on the same web plates are connected in series and output the monitored optical wave values through the unified interface.

19. An engineering machinery, comprising the boom monitoring system according to claim 9.

* * * * *